United States Patent
Chen et al.

(10) Patent No.: US 8,261,052 B2
(45) Date of Patent: Sep. 4, 2012

(54) METHOD FOR STORING BOOT TIME

(75) Inventors: Yung-Feng Chen, Taipei Hsien (TW); Fang-Yuan Sung, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 334 days.

(21) Appl. No.: 12/501,900

(22) Filed: Jul. 13, 2009

(65) Prior Publication Data

US 2010/0088502 A1    Apr. 8, 2010

(30) Foreign Application Priority Data

Oct. 3, 2008 (TW) .............................. 97138140 A

(51) Int. Cl.
*G06F 9/00* (2006.01)
*G06F 9/24* (2006.01)
*G06F 15/177* (2006.01)
*G06F 7/04* (2006.01)

(52) U.S. Cl. ................... 713/2; 713/1; 713/100; 726/26

(58) Field of Classification Search .................. None
See application file for complete search history.

(56) References Cited

U.S. PATENT DOCUMENTS

| 5,654,905 | A | * | 8/1997 | Mulholland et al. .......... 702/186 |
| 5,894,596 | A | * | 4/1999 | Hayes, Jr. ..................... 455/418 |
| 7,360,074 | B2 | | 4/2008 | Chan et al. |
| 7,818,553 | B2 | * | 10/2010 | Waltermann et al. ............. 713/1 |
| 2002/0188838 | A1 | * | 12/2002 | Welder ............................ 713/2 |
| 2003/0084380 | A1 | | 5/2003 | Piazza et al. |
| 2004/0098578 | A1 | * | 5/2004 | Funayama ....................... 713/2 |
| 2006/0218393 | A1 | * | 9/2006 | Hernandez et al. ........... 713/167 |
| 2007/0113062 | A1 | * | 5/2007 | Osburn et al. .................... 713/1 |

OTHER PUBLICATIONS

Office Action for Chinese Patent Application No. 200810167247.7, mailed on Jun. 24, 2011.
Office Action and Search Report for Taiwan Application No. 97138140, mailed on Feb. 7, 2012, 8 pages.

* cited by examiner

*Primary Examiner* — Ji H Bae

(57) ABSTRACT

A method for storing boot time is performed by a computer product having a programmable read-only memory with a basic/input output system resident therein. The method includes the steps of:
(A) while the computer product is in a process of booting, determining whether a command is received; and
(B) storing system time information of the computer product as boot time information in the programmable read-only memory of the computer product when it is determined in step (A) that no command is received.

This invention takes advantage of the tendency of consumers to not boot the computer product in the event of malfunction. When the malfunctioning computer product is sent to a service center, the repairperson can determine whether the computer product broke down within a warranty period based on latest boot time information stored therein, rather than based on the claims of the consumer.

24 Claims, 3 Drawing Sheets

METHOD FOR STORING BOOT TIME

CROSS-REFERENCE TO RELATED APPLICATION

This application claims priority of Taiwanese application no. 097138140, filed on Oct. 3, 2008.

BACKGROUND OF THE INVENTION

1. Field of the Invention

This invention relates to a method for storing boot time, more particularly to a method for storing boot time information in a programmable read-only memory having a basic/input output system resident therein.

2. Description of the Related Art

The popularity of computer products and the increasing presence of diverse computer product brands on the market have refined production processes as well as post-sale services related to the computer products. Among the post-sale services, warranty service has the greatest influence over consumer purchasing decisions.

Under terms of most warranties, if the computer product malfunctions through no fault of the consumer within a predetermined period following the sale thereof, a manufacturer or retailer will provide free or discounted repair services. Regrettably, the repair services provided under warranty are sometimes abused by opportunistic consumers. Such consumers send the malfunctioning computer product for repair after expiration of the warranty, claiming that the malfunction occurred prior to expiration of the warranty, and that for various reasons the computer product could not have been sent for repair within a warranty period. Requests for such repair service often cause repairpersons to be at a loss as to what service to provide, and give rise to disputes with the consumer.

Such disputes between repairpersons and the consumer can be attributed to a lack of a way of confirming a time at which the computer product broke down. If it were possible to confirm the time at which the computer product broke down, efficiency of the post-sale services of the manufacturer or retailer would be greatly improved.

SUMMARY OF THE INVENTION

Therefore, an object of the present invention is to provide a method for storing boot time in a programmable read-only memory having a basic/input output system resident therein, which is capable of providing a latest boot time for examination.

According to the present invention, there is provided a method for storing boot time, adapted to be performed by a computer product having a programmable read-only memory with a basic/input output system resident therein, the method comprising the steps of:

(A) while the computer product is in a process of booting, determining whether a command is received; and (B) storing system time information of the computer product as boot time information in the programmable read-only memory of the computer product when it is determined in step (A) that no command is received.

Another object of the present invention is to provide a method for storing boot time that maintains previous boot time information stored in the programmable read-only memory when a command is received.

In an embodiment of the invention, the command is an interrupt signal received from an externally connected device through an Inter-Integrated Circuit interface. Since the device is only available to a service center, a consumer cannot use the device to prevent latest boot time information from overwriting previous boot time information stored in the programmable read-only memory.

In an embodiment of the invention, the command is issued by a keyboard controller of the computer product in response to receipt of a character signal from a keyboard that is connected to the computer product. Since the character signal is known only to the service center, the consumer cannot use the character signal to prevent latest boot time information from overwriting previous boot time information stored in the programmable read-only memory.

Yet another object of the present invention is to provide a method for storing boot time that stores flag information in the programmable read-only memory when it has been determined that system time has been altered.

In an embodiment of the invention, the method further comprises, prior to step (B), the step of (C) comparing a system time of the system time information with a boot time of the boot time information that is currently stored in the programmable read-only memory, and determining whether the system time is earlier or later than the boot time. When it is determined that the system time is earlier than the boot time, flag information is stored in the programmable read-only memory. The repairperson can then examine the flag information stored in the programmable read-only memory, and based on the flag information, speculate as to whether a boot time of latest boot time information is one that falls within a warranty period only as a result of alteration of the system time prior to performing the latest boot.

The present invention takes advantage of the tendency of a majority of consumers to not boot the computer product in the event of a malfunction. When the malfunctioning computer product is sent to a service center, the repairperson can determine more definitively whether the computer product broke down within the warranty period based on latest boot time information stored therein. The method thus provides a distinct advantage over the prior art, in which the repairperson can only rely on the word of the consumer for making such determination.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
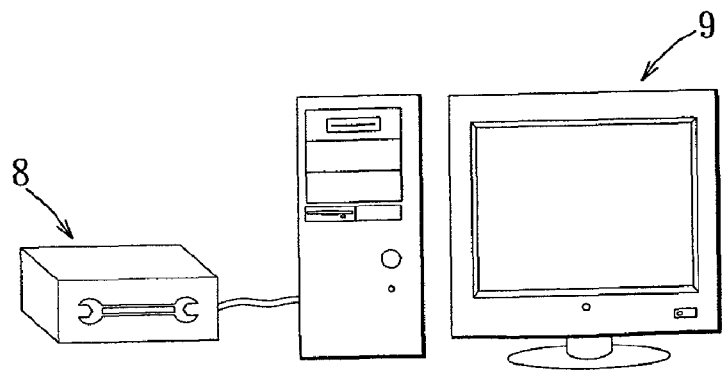
FIG. 1 is a schematic diagram of a device for performing a first preferred embodiment of the method for storing and accessing boot time according to the present invention.

Before the present invention is described in greater detail with reference to the accompanying preferred embodiments, it should be noted herein that like elements are denoted by the same reference numerals throughout the disclosure.

FIG. 1 illustrates a device for performing the first preferred embodiment of the method for storing and accessing boot time according to the present invention. In this embodiment, the device is a computer product 9 that is commonly available on the market, such as notebook computers and servers. In accordance with the method of this embodiment, the computer product 9 stores boot time information each time the computer product 9 is booted. However, when the computer product 9 malfunctions and is sent to a service center of a manufacturer or retailer, a repairperson can connect an externally connected device 8 to the computer product 9, and while the externally connected device 8 is thus connected, boot time information is not stored. Hence, boot time information of a boot performed during repair is prevented from overwriting previous boot time information. Since a majority of consumers do not attempt to boot the computer product 9 in the event of malfunction, it is likely that a time at which the latest boot was performed, as indicated in this invention by a boot time of the boot time information that is stored, is also a time at which the computer product 9 broke down. The repairperson can thus read the boot time information that is stored in the computer product 9 so as to confirm whether the time at which the computer product 9 broke down falls within a warranty period, and determine accordingly whether to provide repair service under terms of the warranty.

Figure 2:
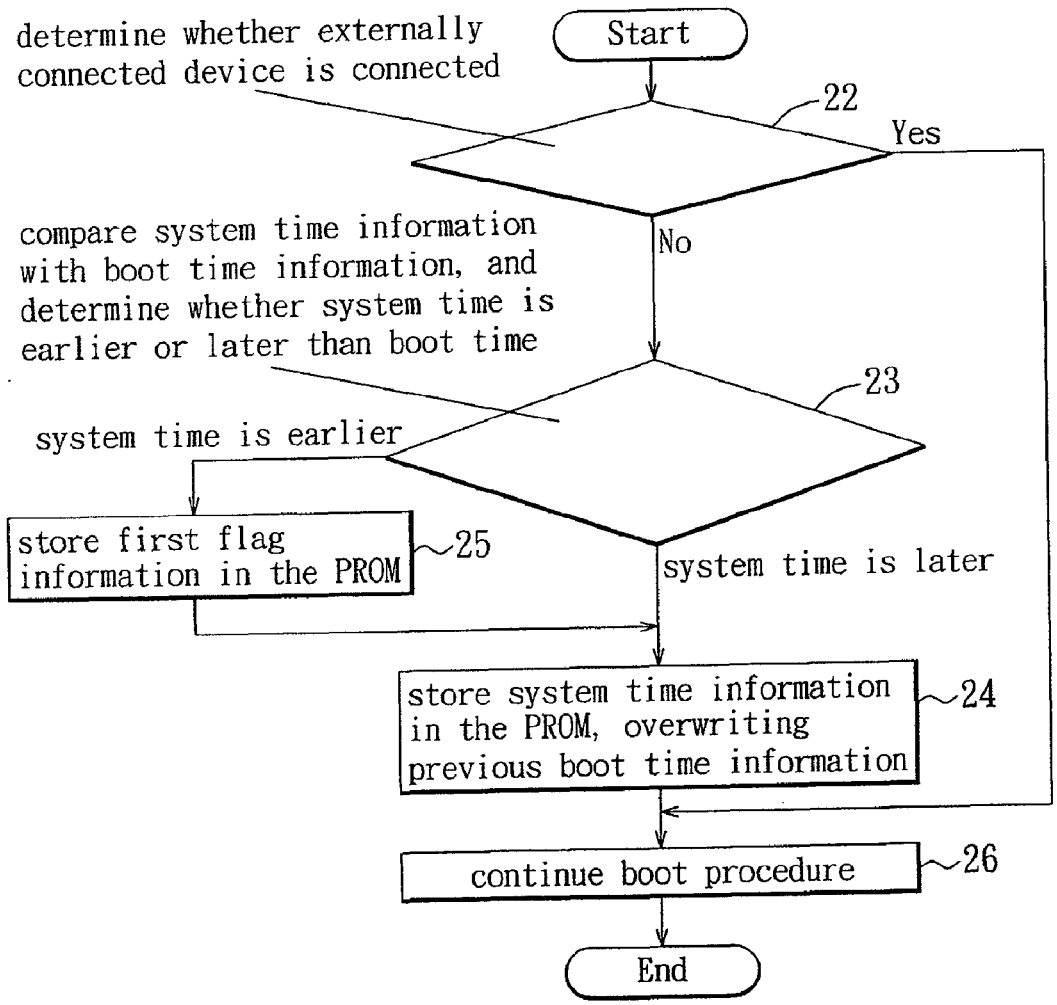
FIG. 2 is flowchart to illustrate a boot performed in accordance with the first preferred embodiment.

FIG. 2 is a flowchart to illustrate a boot performed in accordance with the method of the first preferred embodiment. When it is desired to use the computer product 9, the power button of the computer product 9 is first pressed, and the computer product 9 begins a boot procedure. At this time, a basic input/output system (BIOS) residing in a programmable read-only memory (PROM) of the computer product 9 begins to perform a self-test operation of the computer product 9, and at the same time reads settings information in the complementary metal oxide semiconductor (CMOS), such as hard disk size, CDROM drive information, display device specifications, system time information, etc.

In step 22, through the BIOS, it is determined whether the externally connected device 8 is connected to the computer product 9. It should be noted that the externally connected device 8 is available only to the service center of the manufacturer or retailer, and is not available to the consumer. Therefore, when the consumer initiates the boot of the computer product 9, it is determined accordingly in step 22 that the externally connected device 8 is not connected to the computer product 9. The flow then proceeds to step 23.

In step 23, through the BIOS, system time of the system time information in the CMOS is compared with boot time of the boot time information that is currently stored in the PROM, which is latest boot time information, and it is determined whether the system time is earlier or later than the boot time. Under normal conditions, when the system time has not been reset to an earlier time, it is determined accordingly in step 23 that the system time is later than the boot time, and the flow then proceeds to step 24.

In step 24, the system time information is stored as latest boot time information that overwrites previous boot time information in the PROM. The flow then proceeds to step 26, wherein the BIOS continues the self-test operation of the boot procedure.

When the consumer resets the system time of the computer product 9 to a system time prior to that of warranty expiration, then performs a boot, so as to claim that the computer product 9 broke down within the warranty period when the computer product 9 is later sent for repair, it is determined accordingly in step 23 that the system time is earlier than the boot time. The flow then proceeds to step 25, wherein first flag information is stored in the PROM. The flow then proceeds to steps 24 and 26, respectively. The repairperson can later examine the first flag information that is stored in the PROM, and based on the first flag information, speculate as to whether the boot time of the latest boot time information, which normally indicates the time at which the computer product 9 broke down, is one that falls within the warranty period only as a result of alteration of the system time prior to performing the latest boot, and cannot be relied upon to indicate the time at which the computer product 9 broke down.

In this embodiment, when the computer product 9 is to be examined by the repairperson, it is necessary to connect the externally connected device 8 to the computer product 9 prior to booting. Preferably, the externally connected device 8 is connected to a Video Graphics Array (VGA) port of the computer product 9. After the computer product 9 is powered on, and it is determined accordingly in step 22 that the externally connected device 8 is connected thereto, the BIOS of the computer product 9 is able preferably through an Inter-Integrated Circuit (I$^2$C) interface of the VGA port to receive a command stored in the externally connected device 8. The command, which is preferably an interrupt signal, causes the flow to skip steps 23, 24 or steps 23, 25, 24, and proceed directly to step 26 for completing the boot procedure. It should be noted that, in this embodiment, various program codes have been entered in the BIOS of the computer product 9 beforehand, among which is the program code that, in response to the aforesaid interrupt signal, controls the flow to proceed directly to step 26, skipping steps 23, 24 or steps 23, 25, 24. Thus, when it is determined that the command is received from the externally connected device 8, previous boot time information stored in the PROM is maintained, and is not overwritten during the boot performed while the computer product 9 is under repair. The repairperson can then read the latest boot time information stored in the PROM. Since the externally connected device 8 is only available to the service center of the manufacturer or retailer, the consumer cannot use the externally connected device 8 to prevent storage of boot time information in the PROM each time a boot is performed.

In regards to cost associated with the method of the present invention, it is worth noting that the PROM in which the BIOS resides tends to fill up with various programs, interrupt vector tables, etc. Therefore, in this embodiment, previous boot time information is overwritten each time a boot is performed, so that the goals of the present invention can be met while controlling cost by using as small a space as possible within the PROM.

Figure 3:
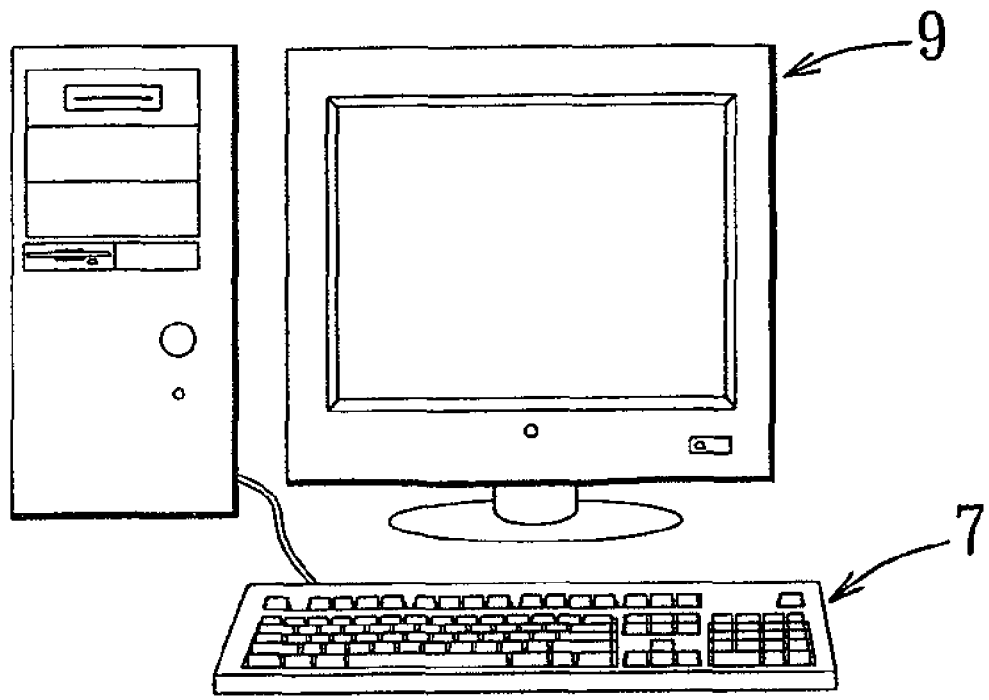
FIG. 3 is a schematic diagram of a device for performing a second preferred embodiment of the method for storing and accessing boot time according to the present invention.

FIG. 3 illustrates a device for performing the second preferred embodiment of the method for storing and accessing boot time according to the present invention. The second preferred embodiment differs from the first preferred embodiment in that the repairperson, instead of connecting the externally connected device 8 to the computer product 9, presses and holds a special key or keys on a keyboard 7 connected to the computer product 9 while pressing the power button so that the keyboard 7 sends a specified character signal (or string of character signals) to the keyboard controller (not shown) of the computer product 9, causing the keyboard controller to transmit an interrupt signal to the BIOS. As in the first preferred embodiment, receipt of the interrupt signal prevents boot time information of the boot performed while the computer product 9 is under repair from overwriting previous boot time information. Naturally, the character signal is known only to the service center of the manufacturer or retailer. The consumer thus cannot generate the character signal so as to prevent storage of boot time information in the PROM each time a boot is performed.

Figure 4:
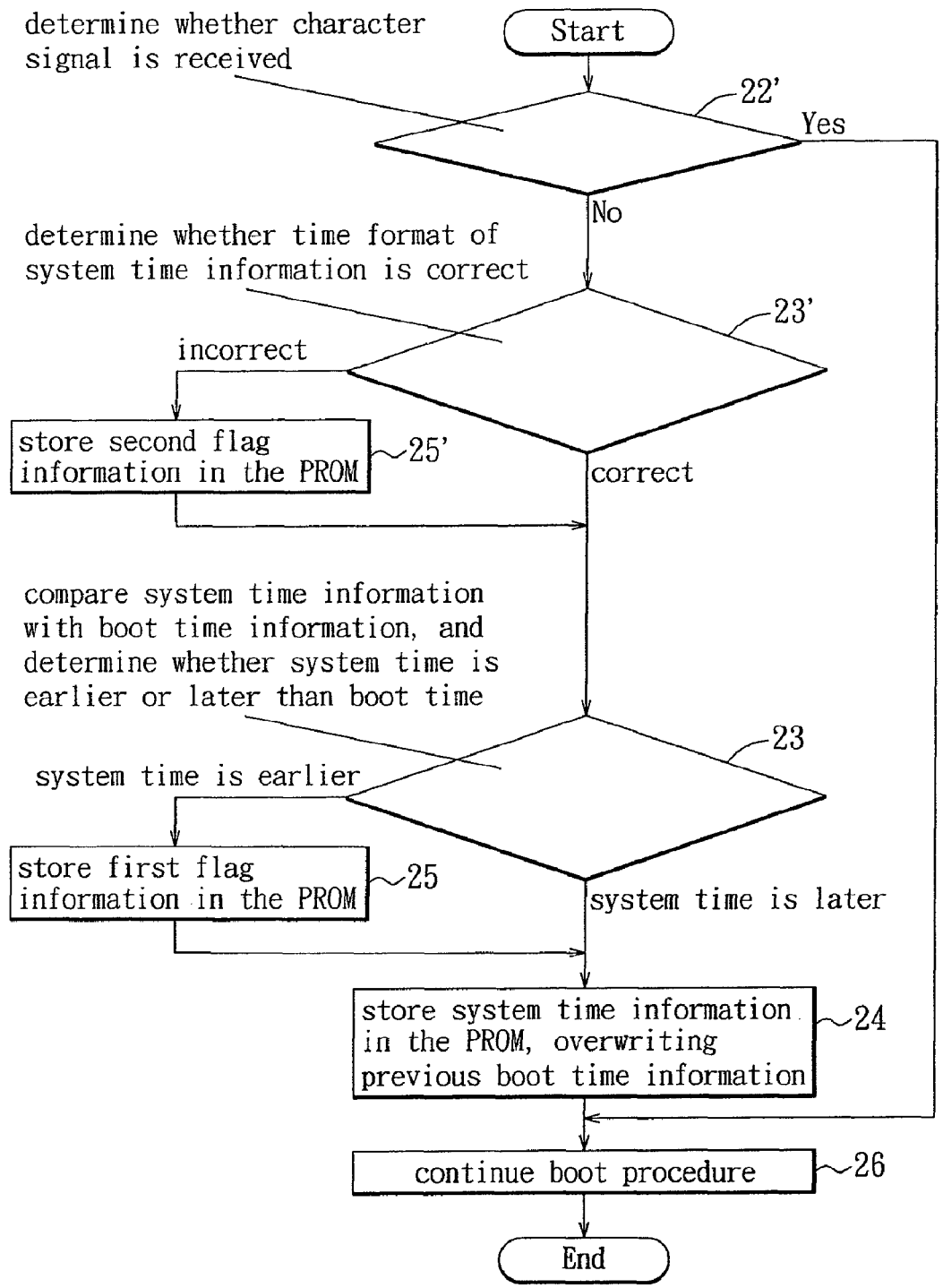
FIG. 4 is a flowchart to illustrate a boot performed in accordance with the second preferred embodiment.

FIG. 4 illustrates the flow of a boot performed in accordance with the second preferred embodiment. The boot performed in accordance with the second preferred embodiment differs from that performed in accordance with the first preferred embodiment in that, supposing the consumer initiates the boot, in step 22', when it is determined accordingly that the interrupt signal, which in this embodiment is produced by the keyboard controller in response to receipt of the character signal from the keyboard 7, has not been received, the flow proceeds to step 23'.

In step 23', through the BIOS, it is determined whether time format of the system time information is correct. Time format can be determined to be incorrect if, for example, the number of days in the month is incorrect, such as in the date 2008/02/30. When it is determined that the time format is correct, the flow proceeds to steps 23, 24, and 26, respectively, and the boot procedure is completed in a manner identical to that of the first preferred embodiment.

Supposing the consumer recklessly alters the system time, or the system time is altered in response to another event so as to result in the time format that is incorrect, when it is determined accordingly in step 23' that the time format of the system time information is incorrect, the flow proceeds to step 25'. In step 25', second flag information is stored in the PROM. The flow then proceeds to steps 23, 24, and 26, respectively, and the boot procedure is completed in a manner identical to that of the first preferred embodiment. Later, the repairperson can examine the first and/or second flag information that is stored in the PROM, determine whether the system time was recently altered based the flag information, and speculate as to whether the latest boot time is one that falls within the warranty period only as a result of alteration of the system time prior to performing the latest boot.

In this embodiment, when the computer product 9 is to be examined by the repairperson, as previously mentioned, the repairperson presses and holds the special key or keys on the keyboard 7 connected to the computer product 9 while pressing the power button so that the keyboard 7 sends the specified character signal to the keyboard controller (not shown) of the computer product 9, causing the keyboard controller to transmit the interrupt signal to the BIOS. In this embodiment, receipt of the character signal by the keyboard controller causes the flow to skip steps 23', 23, 24, and proceed directly to step 26 for completing the boot procedure. Like the first preferred embodiment, various program codes have been entered in the BIOS of the computer product 9 beforehand, among which is the program code that, in response to the interrupt signal issued by the keyboard controller in response to receipt of the character signal, controls the flow to proceed directly to step 26, skipping steps 23, 24 or steps 23, 25, and 24. Previous boot time information stored in the PROM is thus maintained, and is not overwritten during the boot performed while the computer product 9 is under repair. The repairperson can then read the latest boot time information stored in the PROM. As previously mentioned, since only the service center of the manufacturer or retailer knows the character signal, the consumer cannot generate the character signal so as to prevent storage of boot time information in the PROM each time a boot is performed.

It should be noted that, since most PROMs having the BIOS resident therein are Flash ROMs, at the time of manufacture, some memory blocks can be set aside that are rewritable, and some memory blocks can be set aside that are not rewritable. Accordingly, in this embodiment, the memory blocks in the PROM that are used to store the boot time information and the flag information are those that cannot be overwritten by the average consumer. Therefore, storing the boot time information and the flag information in the PROM prevents the consumer from altering the boot time information or the flag information.

In sum, the present invention takes advantage of the tendency of a majority of consumers to not boot the computer product 9 in the event of malfunction. When the malfunctioning computer product 9 is sent to a service center, the repairperson can determine more definitively whether the computer product 9 broke down within the warranty period based on latest boot time information stored therein. The method thus provides a distinct advantage over the prior art, in which the repairperson can only rely on the word of the consumer for making such determination. Moreover, the present invention further includes step 23 and step 23' for determining whether the system time has been altered based on the flag information, enabling the repairperson to speculate as to whether the latest boot date is one that falls within the warranty period only as a result of alteration of the system time prior to performing the latest boot.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for storing boot time, adapted to be performed by a computer product having a programmable read-only memory with a basic/input output system resident therein, said method comprising the steps of:
   (A) while the computer product is in a process of booting, determining whether a command is received from an externally connected device, the command not being stored at the computer product prior to starting the process of booting; and
   (B) storing system time information of the computer product as boot time information in the programmable read-only memory of the computer product when it is determined in step (A) that no command is received.

2. The method for storing boot time as claimed in claim 1, wherein the command is an interrupt signal.

3. The method for storing boot time as claimed in claim 2, wherein the command is received from the externally connected device through an Inter-Integrated Circuit interface of the computer product.

4. The method for storing boot time as claimed in claim 3, wherein the command is received from the externally connected device through the Inter-Integrated Circuit interface of a Video Graphics Array port of the computer product.

5. The method for storing boot time as claimed in claim 2, wherein the externally connected device is a keyboard, and the command is associated with a character signal inputted via the keyboard.

6. The method for storing boot time as claimed in claim 1, further comprising, prior to step (B), the step of
   (C) comparing a system time of the system time information with a boot time of the boot time information that is currently stored in the programmable read-only memory, and
   determining whether the system time is earlier or later than the boot time,
   wherein step (B) is performed following step (C) when it is determined in step (C) that the system time is later than the boot time, and wherein, in step (B), the system time information is stored as latest boot time information that overwrites previous boot time information in the programmable read-only memory.

7. The method for storing boot time as claimed in claim 6, further comprising the step of
(D) storing flag information in the programmable read-only memory when it is determined in step (C) that the system time is earlier than the boot time, and
wherein step (B) is performed following step (D).

8. The method for storing boot time as claimed in claim 7, further comprising the step of
(E) maintaining previous boot time information stored in the programmable read-only memory when it is determined in step (A) that the command is received.

9. The method for storing boot time as claimed in claim 1, further comprising, prior to step (B), the step of
(C) determining whether time format of the system time information is correct, and
wherein step (B) is performed following step (C) when it is determined in step (C) that the time format of the system time information is correct, and
wherein, in step (B), the system time information is stored as latest boot time information that overwrites previous boot time information in the programmable read-only memory.

10. The method for storing boot time as claimed in claim 9, further comprising the step of
(D) storing flag information in the programmable read-only memory when it is determined in step (C) that the time format of the system time information is incorrect, and
wherein step (B) is performed following step (D).

11. The method for storing boot time as claimed in claim 10, further comprising the step of
(E) maintaining previous boot time information stored in the programmable read-only memory when it is determined in step (A) that the command is received.

12. A method for accessing boot time, adapted to be performed by a computer product having a programmable read-only memory with a basic/input output system resident therein, said method comprising the steps of:
(A) while the computer product is in a process of booting, determining whether a command is received from an externally connected device during that booting;
(B) storing system time information of the computer product as boot time information in the programmable read-only memory of the computer product when it is determined in step (A) that no command is received; and
(C) reading the boot time information that is stored in the programmable read-only memory.

13. The method for accessing boot time as claimed in claim 12, wherein the command is an interrupt signal.

14. The method for accessing boot time as claimed in claim 13, wherein the command is received from the externally connected device through an Inter-Integrated Circuit interface of the computer product.

15. The method for accessing boot time as claimed in claim 14, wherein the command is received from the externally connected device through the Inter-Integrated Circuit interface of a Video Graphics Array port of the computer product.

16. The method for accessing boot time as claimed in claim 13, wherein the externally connected device is a keyboard, and the command is associated with a character signal inputted via the keyboard.

17. The method for accessing boot time as claimed in claim 12, further comprising, prior to step (B), the step of:
(D) comparing a system time of the system time information with a boot time of the boot time information that is currently stored in the programmable read-only memory, and
determining whether the system time is earlier or later than the boot time,
wherein step (B) is performed following step (D) when it is determined in step (D) that the system time is later than the boot time, and
wherein, in step (B), the system time information is stored as latest boot time information that overwrites previous boot time information in the programmable read-only memory.

18. The method for accessing boot time as claimed in claim 17, further comprising the step of
(E) storing flag information in the programmable read-only memory when it is determined in step (D) that the system time is earlier than the boot time, and
wherein step (B) is performed following step (D).

19. The method for accessing boot time as claimed in claim 18, further comprising the step of
(F) maintaining previous boot time information stored in the programmable read-only memory when it is determined in step (A) that the command is received.

20. The method for accessing boot time as claimed in claim 18, further comprising the step of:
(G) examining the flag information that is stored in the programmable read-only memory.

21. The method for accessing boot time as claimed in claim 12, further comprising, prior to step (B), the step of
(D) determining whether time format of the system time information is correct, and
wherein step (B) is performed following step (D) when it is determined in step (D) that the time format of the system time information is correct, and
wherein, in step (B), the system time information is stored as latest boot time information that overwrites previous boot time information in the programmable read-only memory.

22. The method for accessing boot time as claimed in claim 21, further comprising the step of
(E) storing flag information in the programmable read-only memory when it is determined in step (D) that the time format of the system time information is incorrect, and
wherein step (B) is performed following step (E).

23. The method for accessing boot time as claimed in claim 22, further comprising the step of
(F) maintaining previous boot time information stored in the programmable read-only memory when it is determined in step (A) that the command is received.

24. The method for accessing boot time as claimed in claim 22, further comprising the step of
(G) examining the flag information that is stored in the programmable read-only memory.

* * * * *